(12) United States Patent
Thomas et al.

(10) Patent No.: US 10,100,649 B2
(45) Date of Patent: Oct. 16, 2018

(54) COMPLIANT RAIL HANGER

(71) Applicants: Rolls-Royce Corporation, Indianapolis, IN (US); Rolls-Royce North American Technologies, Inc., Indianapolis, IN (US)

(72) Inventors: David J. Thomas, Brownsburg, IN (US); Joseph P. Lamusga, Indianapolis, IN (US); Ted J. Freeman, Danville, IN (US); Andrew J. Lazur, Huntington Beach, CA (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 401 days.

(21) Appl. No.: 15/066,701

(22) Filed: Mar. 10, 2016

(65) Prior Publication Data

US 2016/0290140 A1    Oct. 6, 2016

Related U.S. Application Data

(60) Provisional application No. 62/140,663, filed on Mar. 31, 2015.

(51) Int. Cl.
| | | |
|---|---|---|
| *F01D 11/08* | (2006.01) | |
| *F01D 5/22* | (2006.01) | |
| *F01D 25/24* | (2006.01) | |

(52) U.S. Cl.
CPC .............. *F01D 5/225* (2013.01); *F01D 11/08* (2013.01); *F01D 25/246* (2013.01); *F05D 2240/11* (2013.01); *F05D 2260/30* (2013.01); *F05D 2300/6033* (2013.01); *Y02T 50/672* (2013.01)

(58) Field of Classification Search
CPC ... F01D 11/08; F05D 2240/11; F05D 2260/30
See application file for complete search history.

(56) References Cited

U.S. PATENT DOCUMENTS

| | | | |
|---|---|---|---|
| 4,576,548 A | 3/1986 | Smed et al. | |
| 4,759,687 A | 7/1988 | Miraucourt et al. | |
| 5,603,510 A | 2/1997 | Sanders | |
| 6,048,170 A | 4/2000 | Dodd | |
| 6,062,813 A | 5/2000 | Halliwell et al. | |
| 6,315,519 B1 | 11/2001 | Bagepalli et al. | |
| 6,572,115 B1 | 6/2003 | Sarshar et al. | |
| 6,702,550 B2 * | 3/2004 | Darkins, Jr. ............. | F01D 9/04 415/116 |

(Continued)

FOREIGN PATENT DOCUMENTS

| | | |
|---|---|---|
| DE | 102009003423 A1 | 8/2009 |
| EP | 0844369 A1 | 8/1998 |

(Continued)

OTHER PUBLICATIONS

Extended European Search Report, European Application No. 16161058.9-1610, dated Aug. 2, 2016, 7 pages.

*Primary Examiner* — Ninh H Nguyen

(74) *Attorney, Agent, or Firm* — Barnes & Thornburg LLP

(57) ABSTRACT

A gas turbine engine assembly includes a supporting component and a supported component. The supporting component includes features engaged by the supported component. The supported component comprises ceramic-containing materials.

18 Claims, 5 Drawing Sheets

(56) References Cited

U.S. PATENT DOCUMENTS

| | | |
|---|---|---|
| 6,726,448 B2 | 4/2004 | McGrath et al. |
| 6,733,233 B2 | 5/2004 | Jasklowski et al. |
| 6,932,566 B2 | 8/2005 | Suzumura et al. |
| 6,942,203 B2 | 9/2005 | Schroder et al. |
| 6,997,673 B2 * | 2/2006 | Morris .................... F01D 9/04 415/1 |
| 7,189,057 B2 | 3/2007 | Lee et al. |
| 7,207,771 B2 | 4/2007 | Synnott et al. |
| 7,217,089 B2 * | 5/2007 | Durocher ............ F01D 11/005 415/170.1 |
| 7,229,246 B2 | 6/2007 | Ghasripoor et al. |
| 7,238,002 B2 | 7/2007 | Cairo et al. |
| 7,435,049 B2 | 10/2008 | Ghasripoor et al. |
| 7,726,936 B2 | 6/2010 | Keller et al. |
| 8,047,773 B2 | 11/2011 | Bruce et al. |
| 8,257,029 B2 | 9/2012 | Habarou et al. |
| 8,834,105 B2 | 9/2014 | Albers et al. |
| 9,249,684 B2 | 2/2016 | Lazur et al. |
| 9,593,596 B2 | 3/2017 | Uskert et al. |
| 2002/0192074 A1 | 12/2002 | Turnquist et al. |
| 2003/0102630 A1 | 6/2003 | Dinc et al. |
| 2004/0188947 A1 | 9/2004 | Paprotna |
| 2006/0067815 A1 | 3/2006 | Ghasripoor et al. |
| 2009/0123278 A1 | 5/2009 | Kudeon et al. |
| 2012/0027572 A1 | 2/2012 | Denece et al. |
| 2012/0243977 A1 | 9/2012 | Simonet |
| 2013/0202430 A1 | 8/2013 | Gaudry et al. |
| 2014/0147266 A1 | 5/2014 | Kramer |
| 2015/0377050 A1 | 12/2015 | Freeman et al. |
| 2016/0102572 A1 | 4/2016 | O'Leary |
| 2016/0290140 A1 | 10/2016 | Thomas et al. |
| 2016/0305269 A1 * | 10/2016 | Blaney .................... F01D 11/22 |
| 2017/0260869 A1 | 9/2017 | Vetters et al. |

FOREIGN PATENT DOCUMENTS

| | | |
|---|---|---|
| EP | 16423172 A1 | 4/2006 |
| EP | 2357322 A2 | 8/2011 |
| JP | 61152906 A | 7/1986 |
| WO | 2010103213 A1 | 9/2010 |
| WO | 2014163674 A1 | 10/2014 |

* cited by examiner

COMPLIANT RAIL HANGER

CROSS REFERENCE TO RELATED APPLICATIONS

This application claims priority to and the benefit of U.S. Provisional Patent Application No. 62/140,663, filed 31 Mar. 2015, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds sometimes include assembled components having different rates of expansion. Thus, the assembled components may experience areas of localized stress during heating and cooling of the assembly.

SUMMARY

The present application discloses one or more of the features recited in the appended claims and/or the following features which, alone or in any combination, may comprise patentable subject matter.

According to the present disclosure, a turbine shroud may include a plurality of carrier segments comprising metallic materials and arranged circumferentially adjacent to one another around an axis, and a plurality of blade track segments comprising ceramic-matrix composite materials and arranged circumferentially adjacent to one another around the axis. Each carrier segment may include a body and a bracket that extends inwardly in a radial direction from the body toward the axis. Each blade track segment may include a runner and at least one hanger that extends outwardly in the radial direction from the runner.

In illustrative embodiments, at least one of the hangers of each blade track segment may engage with the bracket of at least one carrier segment to couple the plurality of blade track segments to the carrier segments. The bracket of each carrier segment may be formed to include a plurality of circumferentially spaced apart fingers extending generally axially from the body and arranged to be engaged by the hangers of the blade track segments. The fingers may be configured to flex inward in the radial direction when engaged by the hangers of the blade track segments.

In illustrative embodiments, the turbine shroud may include a plurality of retainer segments comprising metallic materials and arranged circumferentially adjacent to one another around an axis. Each retainer segment may include a body and a bracket that extends inwardly in a radial direction from the body toward the axis. The bracket of each retainer segment may be formed to include a plurality of circumferentially spaced apart fingers extending generally axially from the body of the retainer and arranged to be engaged by the hangers of the blade track segments. The fingers may be configured to flex inward in the radial direction when engaged by the hangers of the blade track segments.

In illustrative embodiments, each of the carrier segments may further include a stop wall coupled to the body of the carrier segment radially inward of the plurality of fingers. Each stop wall may be spaced apart from the plurality of fingers such that a flex gap is positioned between the stop wall and the plurality of fingers. Each stop wall may be configured to engage with the plurality of fingers to block the plurality of fingers from flexing radially inward of the stop wall.

In illustrative embodiments, each of the fingers may include a free end spaced apart from the body and a radially outer surface extending between the body and the free end. The radially outer surface may be formed to include a contact feature positioned to contact the hangers of the blade track segments. In some embodiments, the contact feature may be a lip extending radially outward from the free end of the finger. In some embodiments, the contact feature may be a convex wall extending axially along and radially outward from the radially outer surface of the finger. In some embodiments, the contact feature may be a convex wall extending circumferentially along and radially outward from the radially outer surface of the fingers.

According to another aspect of the present disclosure, a turbine shroud may include a plurality of carrier segments comprising metallic materials and arranged circumferentially adjacent to one another around an axis and a plurality of blade track segments comprising ceramic-matrix composite materials and arranged circumferentially adjacent to one another around the axis. Each carrier segment may include a body and a slot formed along a radially inner portion of the body. Each blade track segment may include a runner and at least one attachment post that extends outwardly in a radial direction from the runner.

In illustrative embodiments, the attachment post of each blade track segment may engage with the slot of at least one carrier segment to couple the plurality of blade track segments to the carrier segments. The slot of each carrier segment may be formed to include a plurality of circumferentially spaced apart fingers and may be arranged to be engaged by the attachment posts of the blade track segments. The fingers may be configured to flex inward in the radial direction when engaged by the attachment posts of the blade track segments.

In illustrative embodiments, each of the slots may include a circumferentially extending outer wall, a first stop wall extending radially inward from the outer wall, and a second stop wall spaced apart from the first stop wall and extending radially inward from the outer wall. A first portion of the plurality of fingers may be positioned along an intersection of the outer wall and the first stop wall and a second portion of the plurality of fingers may be positioned along an intersection of the outer wall and the second stop wall. The first and second portions of the plurality of fingers may extend radially inward from the outer wall and toward one another.

In illustrative embodiments, each of the fingers may include a free end spaced apart from the first and second stop walls and an engagement surface extending between the outer wall and the free end. The first and second stop walls may be configured to engage with the plurality of fingers to block the plurality of fingers from flexing past the first and second stop walls.

In illustrative embodiments, the plurality of fingers may each formed to include a contact feature positioned to contact the attachment posts of the blade track segments. In some embodiments, the contact feature is a lip extending radially outward from a free end of the finger. In some embodiments, the contact feature is a convex wall extending axially along and radially outward from radially outer surface of the finger. In some embodiments, the contact feature is a convex wall extending circumferentially along and radially outward from the radially outer surface of the finger.

According to another aspect of the present disclosure, a method of assembling a turbine shroud is disclosed. The method may include arranging a plurality of carrier segments comprising metallic materials circumferentially adjacent to one another around an axis, each carrier segment including a body and a bracket that extends inwardly in a radial direction from the body toward the axis. The method may also include arranging a plurality of blade track segments comprising ceramic-matrix composite materials circumferentially adjacent to one another around the axis, each blade track segment including a runner and at least one hanger that extends outwardly in the radial direction from the runner.

In illustrative embodiments, the method may include engaging the hangers of the blade track segments with the brackets of the carrier segments to couple the blade track segments with the carrier segments. The bracket of each carrier segment may be formed to include a plurality of circumferentially spaced apart fingers extending generally axially from the body and arranged to be engaged by the hangers of the blade track segments. The fingers may be configured to flex inward in the radial direction when engaged by the hangers of the blade track segments.

According to another aspect of the present disclosure, another method of assembling a turbine shroud is disclosed. The method may include arranging a plurality of carrier segments comprising metallic materials circumferentially adjacent to one another around an axis, each carrier segment including a body and a slot formed along a radially inner portion of the body. The method may also include arranging a plurality of blade track segments comprising ceramic-matrix composite materials circumferentially adjacent to one another around the axis, each blade track segment including a runner and at least one attachment post that extends outwardly in the radial direction from the runner.

In illustrative embodiments, the method may include engaging the attachment posts of the blade track segments with the slots of the carrier segments to couple the blade track segments with the carrier segments. The slot of each carrier segment may be formed to include a plurality of circumferentially spaced apart fingers and may be arranged to be engaged by the attachment posts of the blade track segments. The fingers may be configured to flex inward in the radial direction when engaged by the attachment posts of the blade track segments.

According to another aspect of the present disclosure, an assembly for use in a gas turbine engine may include a support bracket consisting essentially of metallic materials and a supported component comprising ceramic-matrix composite materials. The support bracket may be formed to include a body and a plurality of spaced apart fingers extending generally axially from the body. The supported component may include a body and at least one hanger that extends from the body.

In illustrative embodiments, at least one of the hangers of the supported component may engage the spaced apart fingers of the support bracket and the spaced apart fingers may be configured to flex inwardly and outwardly the radial direction.

In illustrative embodiments, the support bracket may further include a stop wall coupled to the body radially inward of the plurality of fingers. The stop wall may be spaced apart from the plurality of fingers such that a flex gap is positioned between the stop wall and the plurality of fingers. The stop wall may be configured to engage with the plurality of fingers to block the plurality of fingers from flexing radially inward of the stop wall.

In illustrative embodiments, each of the fingers may include a free end spaced apart from the body and a radially outer surface extending between the body and the free end. The radially outer surface may be formed to include a contact feature positioned to contact the hangers of the blade track segments. In some embodiments, the contact feature is a lip extending radially outward from the free end of the finger. In some embodiments, the contact feature is a convex wall extending axially along and radially outward from the radially outer surface of the finger. In some embodiments, the contact feature is a convex wall extending circumferentially along and radially outward from the radially outer surface of the finger.

According to yet another aspect of the present disclosure, an assembly adapted for use in a gas turbine engine may include a support consisting essentially of metallic materials and a supported component comprising ceramic-matrix composite materials. The support may include a body and a slot formed along a radially inner portion of the body. The supported component may include a body and at least one attachment post that extends outwardly in a radial direction from the body.

In illustrative embodiments, the attachment post of each supported component may engage with the slot of the support to couple the supported component to the support. The slot of the support may be formed to include a plurality of circumferentially spaced apart fingers arranged to be engaged by the attachment posts of the supported component. The fingers may be configured to flex in the radial direction when engaged by the attachment posts of the supported components.

In illustrative embodiments, the support may include a circumferentially extending outer wall, a first stop wall extending radially inward from the outer wall, and a second stop wall spaced apart from the first stop wall and extending radially inward from the outer wall. A first portion of the plurality of fingers may be positioned along an intersection of the outer wall and the first stop wall and a second portion of the plurality of fingers may be positioned along an intersection of the outer wall and the second stop wall. The first and second portions of the plurality of fingers may extend radially inward from the outer wall and toward one another.

In illustrative embodiments, each of the fingers may include a free end spaced apart from the first and second stop walls and an engagement surface extending between the outer wall and the free end. The first and second stop walls may be configured to engage with the plurality of fingers to block the plurality of fingers from flexing past the first and second stop walls.

In illustrative embodiments, the plurality of fingers are each formed to include a contact feature positioned to contact the attachment posts of the blade track segments. In some embodiments, the contact feature is a lip extending radially outward from a free end of the finger. In some embodiments, the contact feature is a convex wall extending axially along and radially outward from radially outer surface of the finger. In some embodiments, the contact feature is a convex wall extending circumferentially along and radially outward from the radially outer surface of the finger.

These and other features of the present disclosure will become more apparent from the following description of the illustrative embodiments.

DETAILED DESCRIPTION OF THE DRAWINGS

Figure 1:
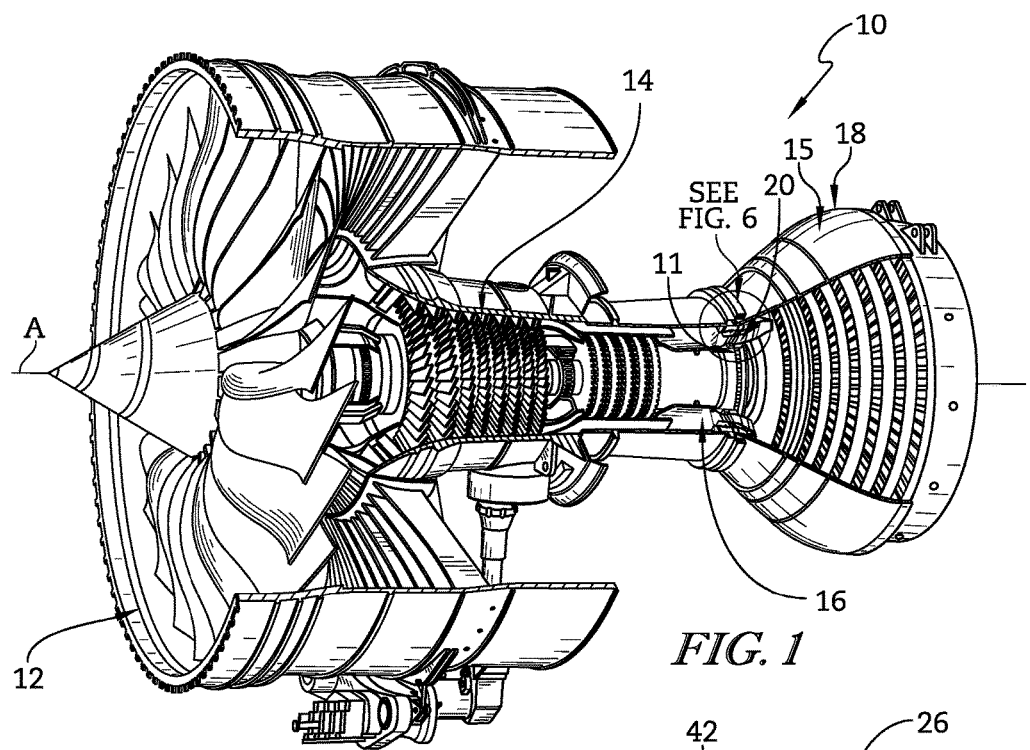
FIG. 1 is a cut-away perspective view of a gas turbine engine showing that the engine includes a fan, a compressor, a combustor, and a turbine, the turbine including a turbine shroud positioned radially outward from blades of a turbine wheel assembly as shown in FIGS. 6 and 7.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 6:
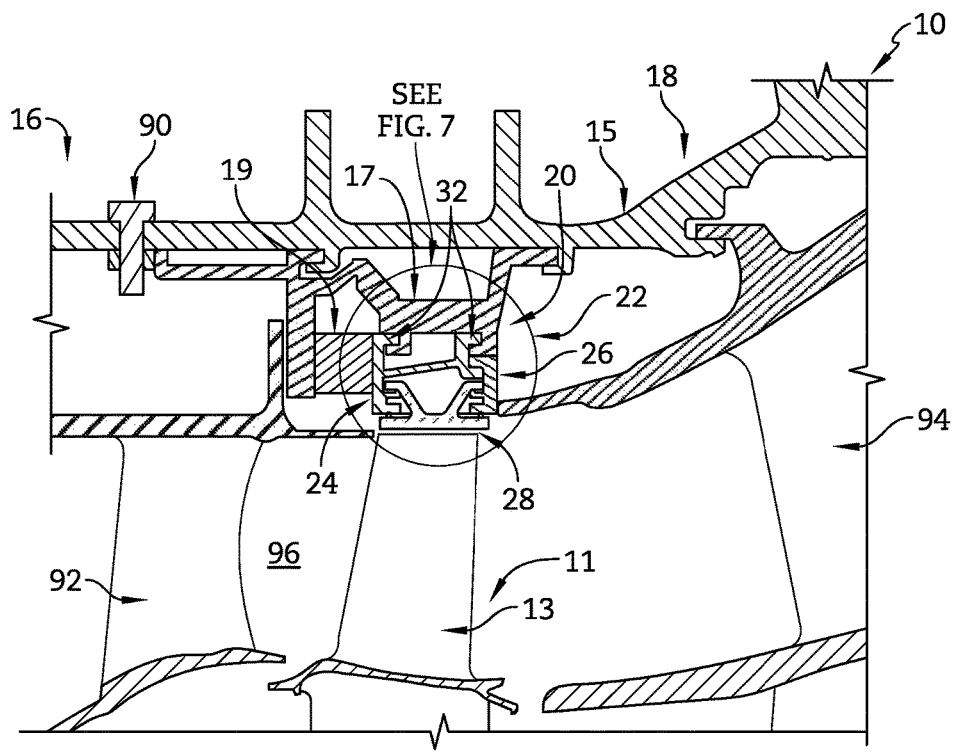
FIG. 6 is a partial sectional view of the gas turbine engine of FIG. 1 showing that the carrier segments and retainer segments couple the blade track segments to an outer case of a turbine section of the gas turbine engine and suggesting that the blade track segment at least partially defines a flow path through the turbine section.

The turbine 18 includes at least one turbine wheel assembly 11 and a turbine shroud 20 positioned to surround the turbine wheel assembly 11 as shown in FIGS. 1 and 6. The turbine shroud 20 is coupled to an outer case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11. The blades 13 are in turn pushed by the combustion products to cause the turbine wheel assembly 11 to rotate; thereby, driving the rotating components of the compressor 14 and/or the fan 12.

Figure 2:
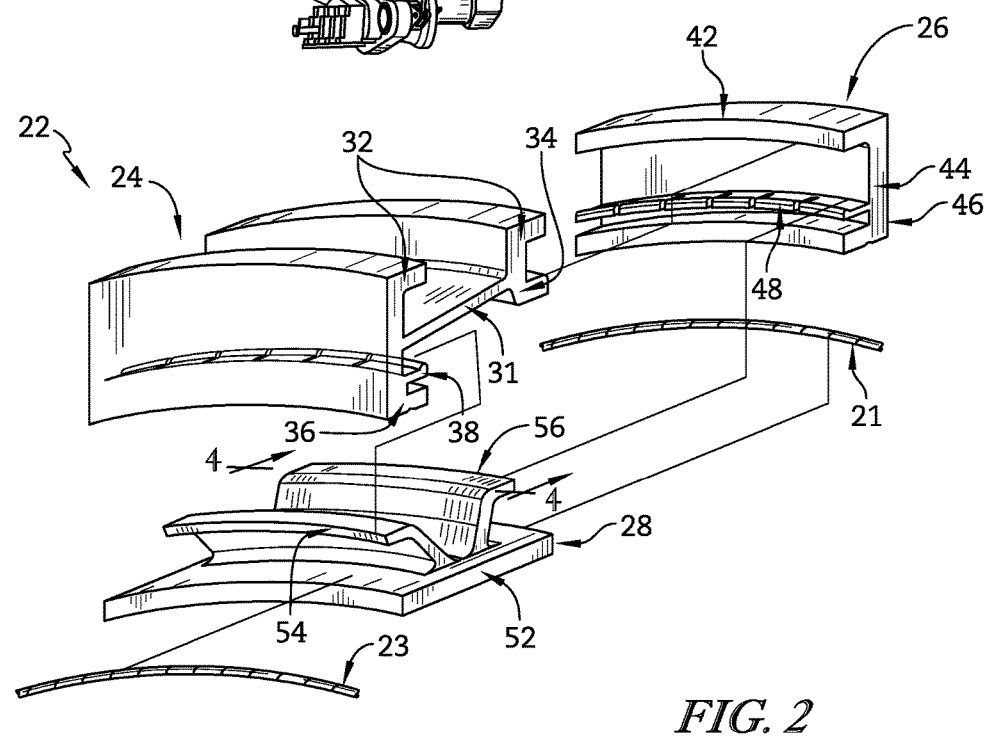
FIG. 2 is an exploded perspective view of a shroud segment included in the turbine shroud showing that a carrier segment and a retainer segment included in the turbine shroud segment each have a plurality of compliant fingers positioned to engage with a blade track segment included in the turbine shroud segment.
Figure 7:
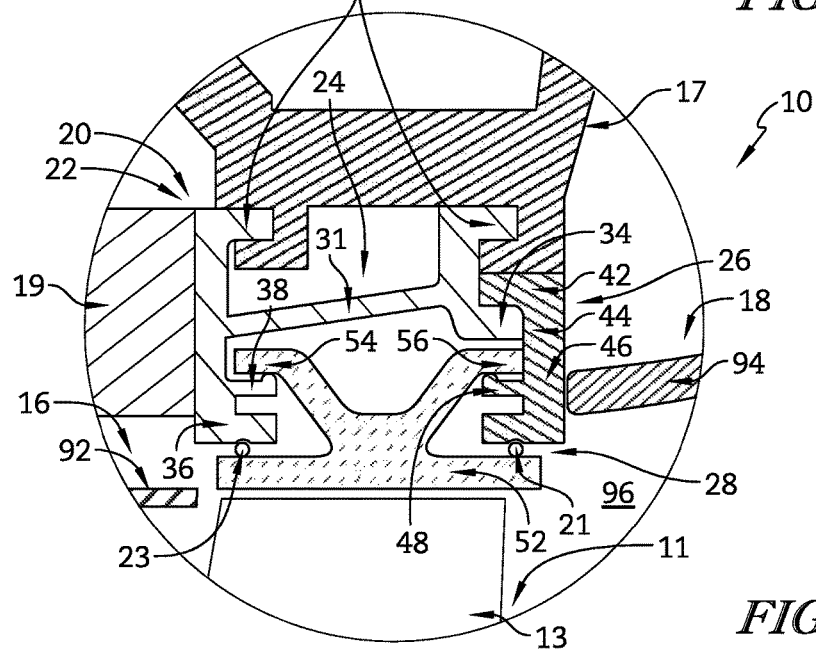
FIG. 7 is a detail view of a portion of FIG. 6 showing that a forward hanger of the blade track segment engages with fingers of the carrier segment and an aft hanger of the blade track segment engages with fingers of the retainer segment.

The turbine shroud 20 extends around the turbine wheel assembly 11 to block combustion products from passing over the blades 13 without pushing the blades 13 to rotate as suggested in FIGS. 6 and 7. In the illustrative embodiment, the turbine shroud 20 is made up of a number of shroud segments 22, one of which is shown in FIG. 2, that extend only part-way around the central axis A and cooperate to surround the turbine wheel assembly 11. In other embodiments, the turbine shroud 20 is annular and non-segmented to extend fully around the central axis A and surround the turbine wheel assembly 11. In yet other embodiments, portions of the turbine shroud 20 are segmented while other portions are annular and non-segmented.

Each shroud segment 22 includes a carrier segment 24, a retainer segment 26, and a blade track segment 28 as shown in FIG. 2. The carrier segment 24 is configured to support the blade track segment 28 in position adjacent to the blades 13 of the turbine wheel assembly 11. The blade track segment 28 is generally concentric with and nested into the carrier segment 24 along the central axis A of the gas turbine engine 10. The retainer segment 26 engages both the carrier segment 24 and the blade track segment 28 to form the shroud segment 22.

In the illustrative embodiment, each of the carrier segments 24 includes case hangers 32, a retainer bracket 34, and a forward bracket 36 as shown in FIG. 2. The case hangers 32 are spaced apart from one another and connected by a web 31. The case hangers 32 couple the carrier segments 24 to the outer case 15 of the engine 10 as shown in FIG. 6. The retainer bracket 34 is illustratively coupled to the web 31 and positioned to engage the retainer segments 26 to couple the retainer segments 26 with the carrier segments 24 as shown in FIG. 2.

The forward bracket 36 is positioned to engage with a forward hanger 54 of the blade track segments 28 as suggested in FIG. 2. The forward bracket 36 includes a plurality of fingers 38 extending axially from the carrier segment 24. Each of the fingers 38 is compliant and is configured to flex when engaged by the blade track segments 28.

Each retainer segment 26 includes a hanger 42, a body 44 coupled to the hanger 42, and an aft bracket 46 coupled to the body 44 as shown in FIG. 2. The hanger 42 engages with the retainer bracket 34 of the carrier segments 24 to couple the retainer segments 26 with the carrier segments 24. The aft bracket 46 is positioned to engage with an aft hanger 56 of the blade track segments 28. The aft bracket 46 includes a plurality of fingers 48 extending axially from the body 44 of the retainer segments 26. Each of the fingers 48 is configured to flex when engaged by the blade track segments 28.

Each blade track segment 28 includes a runner 52, the forward hanger 54 coupled to the runner 52, and the aft hanger 56 coupled to the runner 52 as shown in FIG. 2. The forward and aft hangers 54, 56 extend outward from the runner 52 in a radial direction and away from one another. The runner 52 is configured to block hot gasses from passing over the blades 13 without interacting with the blades 13 when the shroud segments 22 are coupled to the outer case 15 as suggested in FIGS. 6 and 7.

Figure 3:
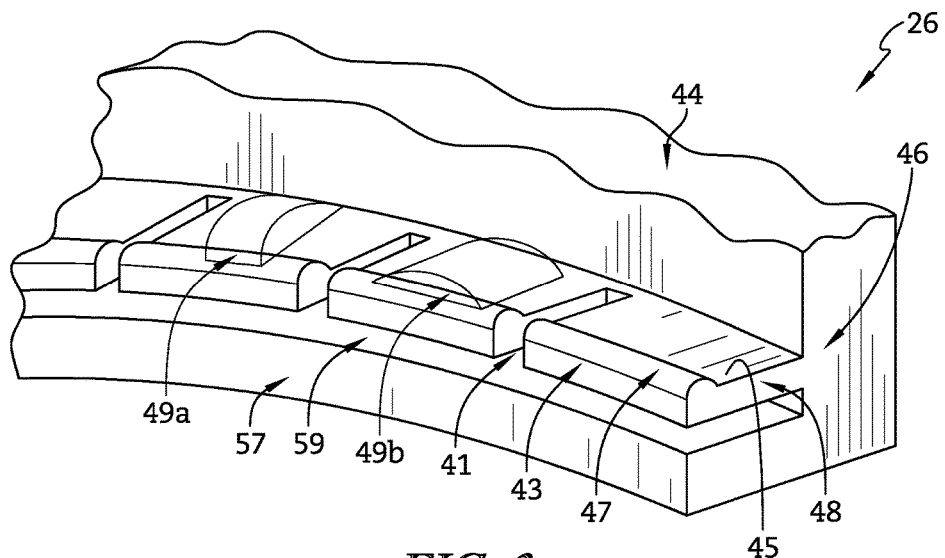
FIG. 3 is a perspective view of a portion of the retainer segment in FIG. 2 showing that the retainer segment includes a radially extending wall, a stop wall coupled to the radially extending wall, and a flex gap positioned between the plurality of compliant fingers and the stop wall of the retainer segment.

The fingers 38, 48 of the forward and aft brackets 36, 46 are circumferentially spaced apart from one another as represented by the retainer segment 26 shown in FIG. 3. A finger gap 41 is positioned between each finger 48 to allow the fingers 48 to flex relative to one another as suggested in FIG. 5. Each of the fingers 48 includes a free end 43 spaced apart from the body 44 and a radially outer surface 45 extending between the body 44 and the free end 43 as shown in FIG. 3.

The radially outer surface 45 of the fingers 48 is formed to include a contact feature positioned to contact the aft hangers 56 of the blade track segments 28. In one embodiment, the contact feature is a lip 47 extending radially outward from the free end 43 of the finger 48. In another embodiment, the contact feature is a convex wall 49a extending axially along and radially outward from the radially outer surface 45 of the finger 48. In yet another embodiment, the contact feature is a convex wall 49b extending circumferentially along and radially outward from the radially outer surface 45 of the finger 48. In some embodiments, a combination of contact features are used.

Figure 4:
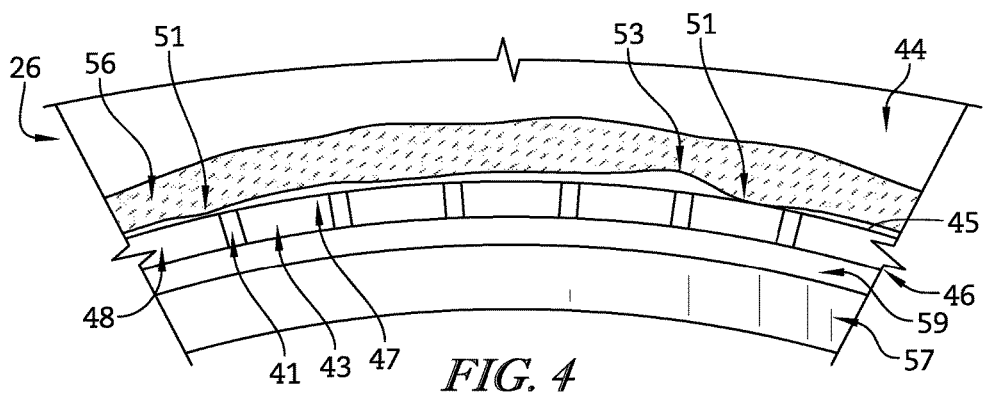
FIG. 4 is a partial sectional view of the shroud segment shown in FIG. 2 showing a hanger of the blade track segment includes a non-uniform surface and suggesting that only peaks of the non-uniform surface engage with the fingers when the gas turbine engine is in an idle state.

When assembled, the aft hanger 56 of the blade track segment 28 engages with the fingers 48 of the aft bracket 46 as shown in FIG. 4. In the illustrative embodiment, the aft hanger 56 has a non-uniform profile after processing of the blade track segments 28. High points 51 of the non-uniform profile engage with the fingers 48 while low points 53 are spaced from the fingers 48 during an idle state of the gas turbine engine 10.

Figure 5:
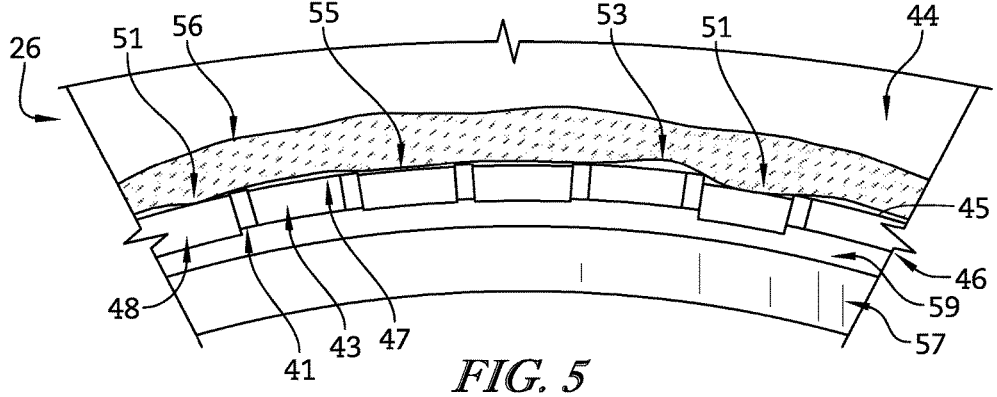
FIG. 5 is a view similar to FIG. 4 suggesting that the hanger of the blade track segment has moved radially inward as the fingers flex during operation of the gas turbine engine to allow additional points of contact between the hanger and retainer segment.

The blade track segments 28 may move radially inward during operation of the gas turbine engine 10 as shown in FIG. 5. The high points 51 of the non-uniform profile of the aft hanger 56 engage with the fingers 48 and cause them to flex radially inward. The low points 53 move toward the fingers 48 and additional points-of-contact 55 between the aft hanger 56 and fingers 48 are created. Accordingly, the fingers may help maintain multiple contact sites through a range of temperatures experienced during operation as components expand and contract. As such, radial loads are circumferentially distributed along the aft hanger 56.

In the illustrative embodiment, the forward and aft brackets 36, 46 also include a stop wall 57 as represented by the retainer segment 26 shown in FIGS. 3-5. The stop wall 57 is spaced radially inward from the fingers 48 to define a flex gap 59 between the fingers 48 and the stop wall 57. The stop wall 57 is positioned to block the fingers 48 from flexing radially inward of the stop wall 57. The flex gap 59 allows the fingers 48 to flex radially inward until they engage the stop wall 57.

The blade track segments 28 are illustratively formed from ceramic-containing materials as suggested in FIGS. 4 and 5. In some embodiments, the blade track segments 28 are formed from ceramic-matrix composite materials. The carrier segments 24 and retainer segments 26 are formed from metallic materials. In some embodiments, the carrier segments 24 and retainer segments 26 are formed as a unitary component and the hangers 54, 56 of the blade track segments 28 are inserted through either end to couple the blade track segments 28 with the unitary component.

During assembly, a plurality of carrier segments 24 are arranged circumferentially adjacent to one another around the central axis A. A plurality of blade track segments 28 are arranged circumferentially adjacent to one another around the central axis A and the forward hangers 54 are engaged with the fingers 38 as suggested in FIG. 2. A plurality of retainer segments 26 are arranged circumferentially adjacent to one another around the central axis A. The hangers 42 of the retainer segments 26 are engaged with the retainer brackets 34 of the carrier segments 24 and the aft hangers 56 of the blade track segments 28 are engaged with the fingers 48 of the retainer segments 26.

Circumferential seal elements 21, 23 extend circumferentially along forward and aft sides of each shroud segment 22 as suggested in FIG. 2. The seal elements 21, 23 are illustratively rope seals. The seal elements 21 are arranged radially between the retainer segments 26 and the blade track segments 28 as shown in FIGS. 2, 6, and 7. The seal elements 23 are arranged radially between the carrier segments 24 and the blade track segments 28. The seal elements 21, 23 block gasses from passing through radial interfaces of components included in the shroud segments 22. In other embodiments, other types of seals may be used as seal elements 21, 23.

The assembled shroud segments 22 are coupled to the outer case 15 as shown in FIGS. 6 and 7. In the illustrative embodiment, the case hangers 32 of the carrier segments 24 are coupled to a mount ring 17. A spacer 19 is positioned between the shroud segments 22 and a portion of the mount ring 17 to restrict movement of the shroud segments 22 relative to the mount ring 17. The mount ring 17 couples to the outer case 15. One or more pins 90 are coupled to the outer case 15 and engage the mount ring 17 to restrict movement of the mount ring 17 relative to the outer case 15.

In the illustrative embodiment, other components are positioned relative to the outer case, such as an exit 92 of the combustor 16 and a static vane assembly 94 included in the turbine 18 for example, as shown in FIGS. 6 and 7. The components cooperate to form a flow path 96 through the engine 10 for passing hot gasses from the combustor 16 over the blades 13 of the turbine wheel assembly 11. In some embodiments, the static vane assembly 94 may contact the retainer segments 26 to restrict movement of the retainer segments 26 relative to the carrier and blade track segments 24, 28.

Figure 8:
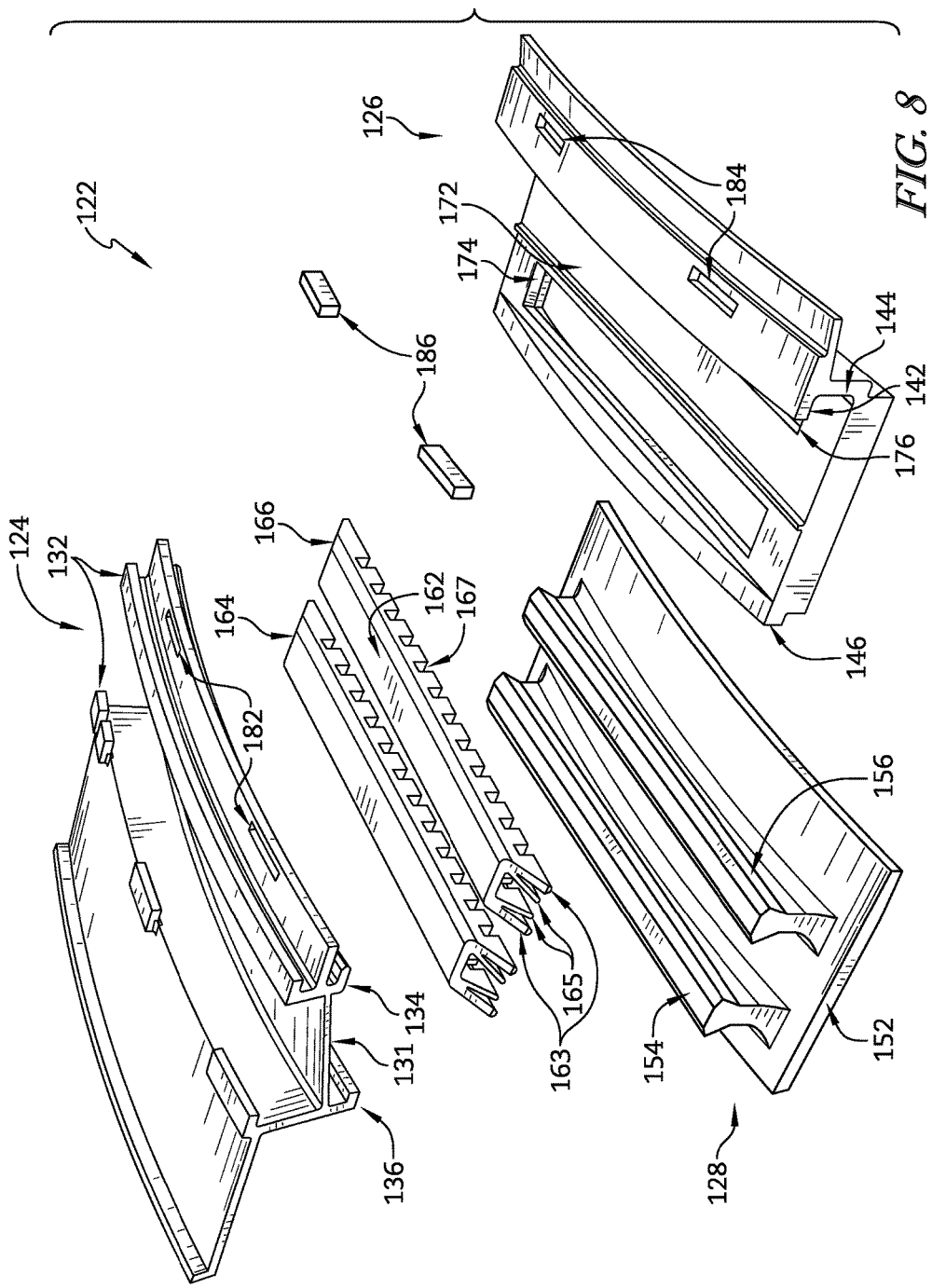
FIG. 8 is an exploded perspective view of another embodiment of a shroud segment in accordance with the present disclosure showing that the shroud segment includes a carrier segment, a retainer segment, and a blade track segment.
Figures 9, 10:
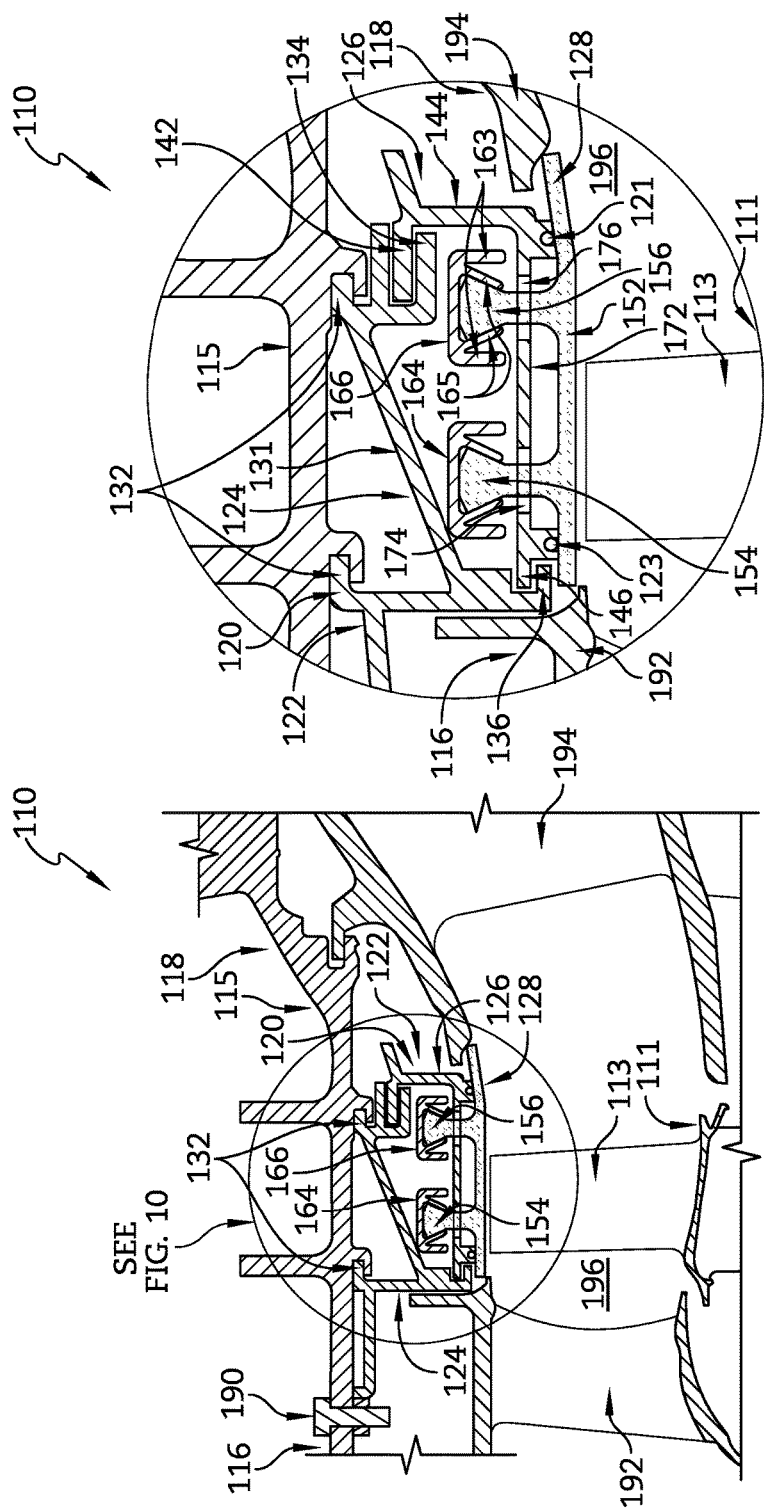
FIG. 9 is a partial sectional view of a gas turbine engine showing that the carrier segments and retainer segments couple the blade track segments to an outer case of a turbine section of the gas turbine engine and suggesting that the blade track segment at least partially defines a flow path through the turbine section.
FIG. 10 is a detail view of a portion of FIG. 9 showing that dovetailed attachment posts of the blade track segment engage with fingers included in a pair of attachment members and suggesting that the attachment members engage with the retainer to support the blade track segment.

Another turbine shroud 120 for use in a gas turbine engine 110, as suggested in FIGS. 9 and 10, illustratively includes a plurality of shroud segments 122, one of which is shown in FIG. 8. A turbine 118 of the engine 110 includes at least one turbine wheel assembly 111 and a turbine shroud 120 positioned to surround the turbine wheel assembly 111 as suggested in FIGS. 9 and 10. The turbine wheel assembly 111 includes a plurality of blades 113 coupled to a rotor disk for rotation therewith. The turbine shroud 120 extends around the turbine wheel assembly 111 to block combustion products from passing over the blades 113 without pushing the blades 13 to rotate. The turbine shroud 120 is coupled to an outer case 115 of the gas turbine engine 110. Hot, high pressure combustion products coming from a combustor 116 are directed toward the blades 113 of the turbine wheel assemblies 111. The blades 113 are in turn pushed by the combustion products to cause the turbine wheel assembly 111 to rotate; thereby, driving other rotating components of the engine 110.

In some embodiments, each of the shroud segments 22 extend only part-way around a central axis of the engine 110 and cooperate to surround the turbine wheel assembly 111. In other embodiments, the turbine shroud 120 is annular and non-segmented to extend fully around the central axis and surround the turbine wheel assembly 111. In yet other embodiments, portions of the turbine shroud 120 are segmented while other portions are annular and non-segmented.

Each shroud segment 122 includes a carrier segment 124, a retainer segment 126, and a blade track segment 128 as shown in FIG. 8. The carrier segment 124 is configured to support the blade track segment 128 in position adjacent to the blades 113 of the turbine wheel assembly 111 as shown in FIGS. 9 and 10. The blade track segment 128 is generally concentric with and nested into the carrier segment 124 along the central axis of the gas turbine engine 110. The retainer segment 126 engages both the carrier segment 124 and the blade track segment 128 to form the shroud segment 122.

In the illustrative embodiment, each of the carrier segments 124 includes case hangers 132, an aft retainer bracket 134, and a forward retainer bracket 136 as shown in FIG. 8. The case hangers 132 are spaced apart from one another and connected by a web 131. The case hangers 132 couple the carrier segments 124 to the outer case 115 of the engine 110 as shown in FIGS. 9 and 10. The aft retainer bracket 134 of the carrier segment 124 is illustratively coupled to the web 131 as shown in FIG. 8. The forward and aft retainer brackets 134, 136 are positioned to engage the retainer segments 126 to couple the retainer segments 126 with the carrier segments 124.

Each retainer segment 126 includes an aft hanger 142, a spacer wall 144 coupled to the aft hanger 142, and a deck 172 coupled to the spacer wall 144 as shown in FIG. 8. The deck 172 is formed to include a forward hanger 146 along a forward edge of the deck 172. The aft hanger 142 engages with the aft retainer bracket 134 of the carrier segments 124 and the forward hanger 146 engages with the forward retainer bracket 136 to couple the retainer segments 126 with the carrier segments 124.

Each blade track segment 128 includes a runner 152, a forward dovetail post 154 coupled to the runner 152, and an aft dovetail post 156 coupled to the runner 152 as shown in FIG. 8. The forward and aft dovetail posts 154, 156 extend outward from the runner 152 in a radial direction and circumferentially along the runner 152. The runner 152 is configured to block hot gasses from passing over the blades 113 without interacting with the blades 113 when the shroud segments 122 are coupled to the outer case 115 as suggested in FIGS. 9 and 10.

Each of the decks 172 of the retainer segments 126 are also formed to include apertures 174, 176 extending radially through and circumferentially along the deck 172 as shown in FIG. 8. The apertures 174, 176 are axially spaced from one another and sized to allow the dovetail posts 154, 156 to pass through the apertures 174, 176, respectively. The dovetail posts 154, 156 are sized to extend radially outward of the deck 172 when the blade track segment 128 engage with the retainer segments 126 as shown in FIG. 10.

A pair of attachment members 164, 166 engage with the dovetail posts 154, 156 of the blade track segments 128, respectively, and engage with the deck 172 of the retainer segments 126 to couple the blade track segments 128 with the retainer segments 126 as shown in FIG. 10. Each of the attachment members 164, 166 includes a web 162 and a pair of flanges 163 extending radially inward from the web 162 and along axial edges of the web 162 as shown in FIG. 8.

The attachment members 164, 166 are formed to include a plurality of radially extending fingers 165 as shown in FIG. 8. The plurality of fingers 165 are coupled circumferentially along the axial edges of the web 162 and are angled toward one another. The attachment members 164, 166 are further formed to include a plurality of slots 167 extending axially across the attachment members 164, 166 and positioned between circumferentially adjacent fingers 165.

The fingers 165 of the attachment members 164, 166 are sized and positioned to engage with the dovetail posts 154, 156 of the blade track segments 128 as shown in FIG. 10. Each of the fingers 165 is configured to flex radially inward when engaged by the blade track segments 128. In some embodiments, the flanges 163 are configured to block the fingers 165 from flexing axially forward or aft of the flanges 163. The fingers 165 are allowed to flex until they engage the flanges 163. The fingers 165 are also configured to block the dovetail posts 154, 156 form passing out of the attachment members 164, 166 in a radial direction.

In some embodiments, the fingers 165 are formed to include a contact feature positioned to contact the dovetail posts 154, 156 of the blade track segments 128. In one embodiment, the contact feature is a circumferentially extending lip positioned between the fingers 165 and the dovetail posts 154, 156. In another embodiment, the contact feature is a convex wall extending axially along and radially outward from the finger 165. In yet another embodiment, the contact feature is a convex wall extending circumferentially along and radially outward from the finger 165. In some embodiments, a combination of contact features are used.

During assembly, the dovetail posts 154, 156 of the blade track segments 128 pass through the apertures 174, 176 of the retainer segments 126 as suggested in FIG. 10. The attachment members 164, 166 slide over and engage the dovetail posts 154, 156 to couple the blade track segments 128 with the retainer segments 126. A plurality of retainer segments 126 are arranged circumferentially adjacent to one another around the central axis of the engine 110. In some embodiments, the blade track segments 128 are coupled to the retainer segments 126 after arranging the retainer segments 126 around the central axis.

The hangers 142, 146 of the retainer segments 126 are engaged with the retainer brackets 134, 136 of the carrier segments 124 as shown in FIG. 10. In the illustrative embodiment, circumferential seal elements 121, 123 extend circumferentially along forward and aft sides of each shroud segment 122 to block gasses from passing through radial interfaces of components included in the shroud segments 122. In the illustrative embodiment, one or more keys 186 are positioned to extend through apertures 182 formed in the carrier segments 124 and into recesses 184 formed in the retainer segments 126 as suggested in FIG. 8. The keys 186 maintain circumferential positioning of the retainer segments 126 relative to the carrier segments 124.

The assembled shroud segments 122 are coupled to the outer case 115 as shown in FIGS. 9 and 10. In the illustrative embodiment, the case hangers 132 of the carrier segments 124 are coupled to the outer case. One or more pins 190 are coupled to the outer case 115 and engage the carrier segments 124 to restrict movement of the carrier segments 124 relative to the outer case 115.

In the illustrative embodiment, other components are positioned relative to the outer case, such as an exit 192 of the combustor 116 and a static vane assembly 194 included in the turbine 118 for example, as shown in FIGS. 9 and 10. The components cooperate to form a flow path 196 through the engine 110 for passing hot gasses from the combustor 116 over the blades 113 of the turbine wheel assembly 111. In some embodiments, the static vane assembly 194 may contact the retainer segments 126 to restrict movement of the retainer segments 126 relative to the carrier segments 124.

The blade track segments 128 are illustratively formed from ceramic-containing materials as suggested in FIGS. 9 and 10. In some embodiments, the blade track segments 128 are formed from ceramic-matrix composite materials. The carrier segments 124, retainer segments 126, and attachment members 164, 166 are illustratively formed from metallic materials. In some embodiments, the carrier segments 124 and retainer segments 126 are formed as a unitary component. In some embodiments, the carrier segments 124 or retainer segments 126 are formed to include dovetail slots having the fingers 165 positioned therein for engaging the dovetail posts 154, 156 of the blade track segments 128. In some embodiments, the dovetail posts 154, 156 and apertures 174, 176 are formed to extend axially instead of circumferentially.

While the illustrative embodiment shows a turbine shroud assembly, the teaching of the present disclosure are not limited to turbine shrouds. Rather, it is contemplated that metallic hangers with compliant fingers (like hanger 54 having compliant fingers 38) may be used to support ceramic-containing components (like carrier segments 24) in other assemblies throughout a gas turbine engine. In one example, it is contemplated that ceramic-containing combustion liner tiles may be supported by metallic hangers having compliant fingers. In another example, it is contemplated that ceramic-containing exhaust shields may be supported by metallic hangers having compliant fingers. Accordingly, any assembly within a gas turbine engine having features as described herein are contemplated and subsequently enabled by the present disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud comprising
a plurality of carrier segments comprising metallic materials and arranged circumferentially adjacent to one another around an axis, each carrier segment including a body and a bracket that extends inwardly in a radial direction from the body toward the axis, and
a plurality of blade track segments comprising ceramic-matrix composite materials and arranged circumferentially adjacent to one another around the axis, each blade track segment including a runner and at least one hanger that extends outwardly in the radial direction from the runner,
wherein at least one of the hangers of each blade track segment engages with the bracket of at least one carrier segment to couple the plurality of blade track segments to the carrier segments, the bracket of each carrier segment is formed to include a plurality of circumferentially spaced apart fingers extending generally axially from the body and arranged to be engaged by the hangers of the blade track segments, and the fingers are configured to flex inward in the radial direction when engaged by the hangers of the blade track segments.

2. The turbine shroud of claim 1, further comprising a plurality of retainer segments comprising metallic materials and arranged circumferentially adjacent to one another around an axis, each retainer segment including a body and a bracket that extends inwardly in a radial direction from the body toward the axis, wherein the bracket of each retainer segment is formed to include a plurality of circumferentially spaced apart fingers extending generally axially from the body of the retainer and arranged to be engaged by the hangers of the blade track segments, and the fingers are configured to flex inward in the radial direction when engaged by the hangers of the blade track segments.

3. The turbine shroud of claim 1, wherein each of the carrier segments further includes a stop wall coupled to the body of the carrier segment radially inward of the plurality of fingers.

4. The turbine shroud of claim 3, wherein each stop wall is spaced apart from the plurality of fingers such that a flex gap is positioned between the stop wall and the plurality of fingers.

5. The turbine shroud of claim 4, wherein each stop wall is configured to engage with the plurality of fingers to block the plurality of fingers from flexing radially inward of the stop wall.

6. The turbine shroud of claim 1, wherein each of the fingers includes a free end spaced apart from the body and a radially outer surface extending between the body and the free end and the radially outer surface is formed to include a contact feature positioned to contact the hangers of the blade track segments.

7. The turbine shroud of claim 6, wherein the contact feature is a lip extending radially outward from the free end of the finger.

8. The turbine shroud of claim 6, wherein the contact feature is a convex wall extending axially along and radially outward from the radially outer surface of the finger.

9. The turbine shroud of claim 6, wherein the contact feature is a convex wall extending circumferentially along and radially outward from the radially outer surface of the finger.

10. A turbine shroud comprising
a plurality of carrier segments comprising metallic materials and arranged circumferentially adjacent to one another around an axis, each carrier segment including a body and a slot formed along a radially inner portion of the body, and
a plurality of blade track segments comprising ceramic-matrix composite materials and arranged circumferentially adjacent to one another around the axis, each blade track segment including a runner and at least one attachment post that extends outwardly in a radial direction from the runner,
wherein the attachment post of each blade track segment engages with the slot of at least one carrier segment to couple the plurality of blade track segments to the carrier segments, the slot of each carrier segment is formed to include a plurality of circumferentially spaced apart fingers and arranged to be engaged by the attachment posts of the blade track segments, and the fingers are configured to flex inward in the radial direction when engaged by the attachment posts of the blade track segments.

11. The turbine shroud of claim 10, wherein each of the slots includes a circumferentially extending outer wall, a first stop wall extending radially inward from the outer wall, and a second stop wall spaced apart from the first stop wall and extending radially inward from the outer wall,
wherein a first portion of the plurality of fingers are positioned along an intersection of the outer wall and the first stop wall and a second portion of the plurality of fingers are positioned along an intersection of the outer wall and the second stop wall, and
wherein the first and second portions of the plurality of fingers extending radially inward from the outer wall and toward one another.

12. The turbine shroud of claim 11, wherein each of the fingers includes a free end spaced apart from the first and second stop walls and an engagement surface extending between the outer wall and the free end.

13. The turbine shroud of claim 12, wherein the first and second stop walls are configured to engage with the plurality of fingers to block the plurality of fingers from flexing past the first and second stop walls.

14. The turbine shroud of claim 10, wherein the plurality of fingers are each formed to include a contact feature positioned to contact the attachment posts of the blade track segments.

15. The turbine shroud of claim 14, wherein the contact feature is a lip extending radially outward from a free end of the finger.

16. The turbine shroud of claim 14, wherein the contact feature is a convex wall extending axially along and radially outward from radially outer surface of the finger.

17. The turbine shroud of claim 14, wherein the contact feature is a convex wall extending circumferentially along and radially outward from the radially outer surface of the finger.

18. A method of assembling a turbine shroud comprising arranging a plurality of carrier segments comprising metallic materials circumferentially adjacent to one another around an axis, each carrier segment including a body and a bracket that extends inwardly in a radial direction from the body toward the axis,
arranging a plurality of blade track segments comprising ceramic-matrix composite materials circumferentially adjacent to one another around the axis, each blade track segment including a runner and at least one hanger that extends outwardly in the radial direction from the runner, and
engaging the hangers of the blade track segments with the brackets of the carrier segments to couple the blade track segments with the carrier segments,
wherein the bracket of each carrier segment is formed to include a plurality of circumferentially spaced apart fingers extending generally axially from the body and arranged to be engaged by the hangers of the blade track segments, and the fingers are configured to flex inward in the radial direction when engaged by the hangers of the blade track segments.

* * * * *